(No Model.) 2 Sheets—Sheet 1.
J. B. SOHN.
WINDMILL.
No. 355,726. Patented Jan. 11, 1887.
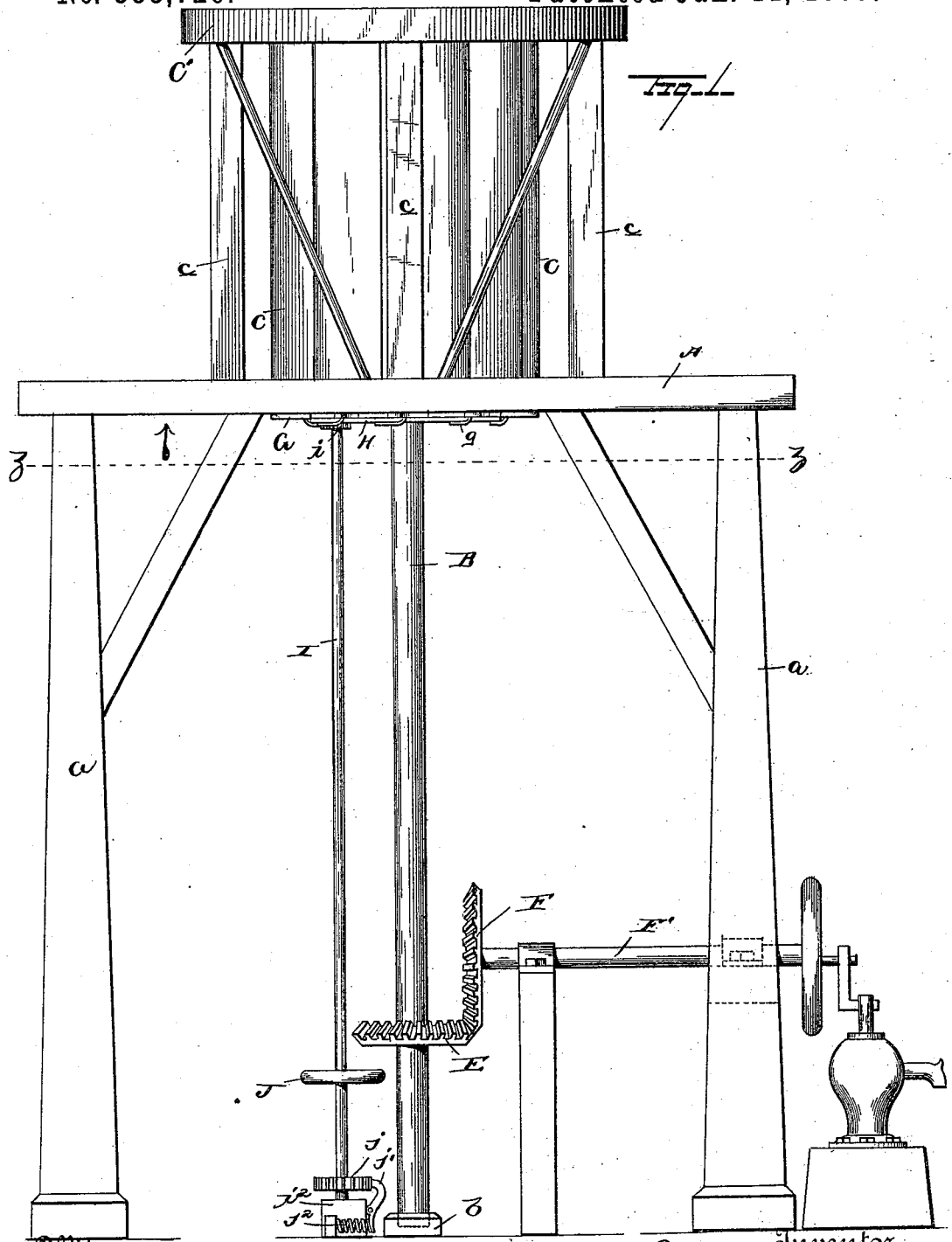

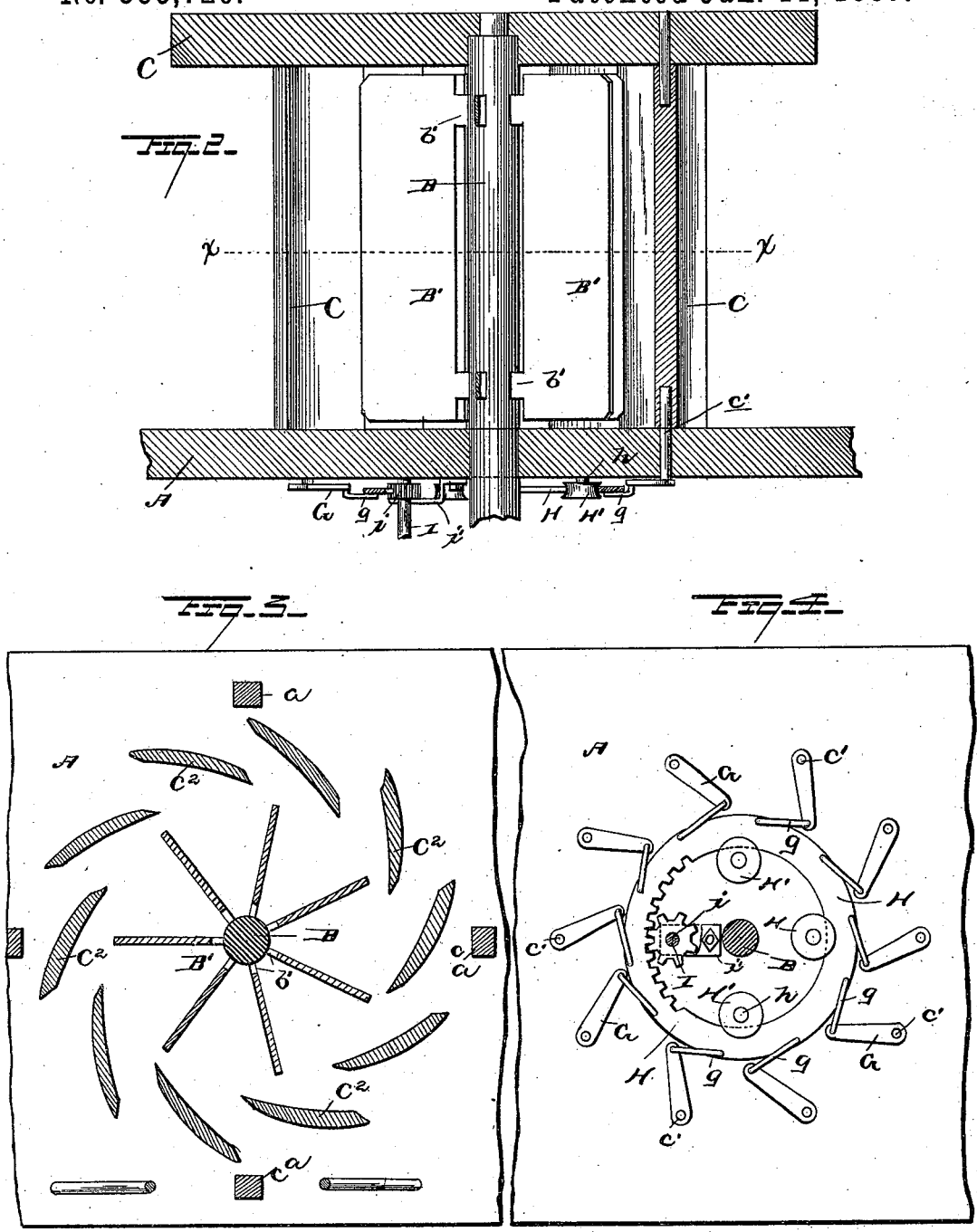

UNITED STATES PATENT OFFICE.

JOHN BERNARD SOHN, OF VISALIA, CALIFORNIA.

WINDMILL.

SPECIFICATION forming part of Letters Patent No. 355,726, dated January 11, 1887.

Application filed September 6, 1886. Serial No. 212,826. (No model.)

*To all whom it may concern:*

Be it known that I, JOHN BERNARD SOHN, a citizen of the United States, residing at Visalia, in the county of Tulare and State of California, have invented a new and useful Improvement in Windmills, of which the following is a specification.

My invention relates to improvements in windmills; and it consists of the peculiar combination and novel construction and arrangement of the various parts for service, substantially as hereinafter fully set forth, and specifically pointed out in the claims.

The object of my invention is to provide an improved windmill with means whereby the wheel can be entirely housed within a suitable inclosing-casing, so that the wind cannot have access thereto when a very high wind or storm is prevailing, and thereby protect the wheel from injury and damage.

The housing consists of a series of swinging sections, which are connected to a common disk or wheel so that they can be all operated and adjusted simultaneously and to an equal extent, so that the wind can enter the spaces between any number of sections or shutters and in any direction, all as more fully described hereinafter.

In the accompanying drawings, which illustrate a windmill embodying my invention, Figure 1 is a side elevation showing the sections of the housing or shutters closed. Fig. 2 is a vertical central sectional view thereof with the sections opened. Fig. 3 is a horizontal sectional view on the line $x$ $x$ of Fig. 2. Fig. 4 is a horizontal sectional view on the line $z$ $z$ of Fig. 1, looking in the direction indicated by the arrow.

Referring to the drawings, in which like letters of reference denote corresponding parts in all the figures, A designates a horizontal platform, which is elevated at a suitable height above the ground by means of suitable uprights or posts, $a$.

B designates a vertical shaft, which is journaled in suitable bearings in the platform and in the roof of the housing C, presently described, and this shaft is extended through the platform down to the ground or other place, the lower end of the said shaft being stepped in a suitable bearing, $b$. The lower end of the vertical shaft carries a beveled gear-wheel, E, that rotates therewith, and meshes with a similar bevel gear-wheel, F, on one extremity of a horizontal counter-shaft, F', through which motion and power are transmitted to the machinery to be driven or operated—as, for instance, a pump, as shown herein, or other suitable apparatus. The upper end of the vertical shaft carries a horizontal wheel, B', which comprises a series of radial arms, $b'$, and the vertical blades connecting the arms at the extremities of the latter, and the wind enters the housing C through the openings or spaces between the shutters thereof, and acts upon the blades of the wheel to rotate the latter and the vertical counter-shafts, as is obvious.

The housing C has a roof or top, C', which is elevated above and securely affixed to the platform A by means of suitable uprights, $c$, and the housing has a series of sections or shutters, $C^2$, which are each made segmental in transverse section and pivoted centrally, so that they can be adjusted to bring their contiguous edges in contact with each other to entirely inclose the wheel and protect it from injury and the weather. These sections $C^2$ are beveled at their opposite edges, as shown, so as to form a tight and close joint when they are closed and come in contact with each other, and at their ends they are provided with central trunnions or pivots, $c'$, which enter suitable recesses or bearings in the horizontal platform and roof of the housing, so that they are free to swing or move in order to open and close them, as may be desired. The lower trunnion or pivot of each of the sections or shutters is extended through the platform, and provided with a right-angled arm, G, on the under side of the platform. The outer extremities of these crank-arms G of the swinging sections or shutters are connected with the rim or periphery of a rotary disk or ring, H, by intermediate links, $g$, which are pivotally connected to the arms and the ring. This ring or disk is supported in place by means of three or more friction-rollers, H', which are loosely journaled on suitable pins or shafts, $h$, that are rigidly affixed in the lower side of the horizontal platform, so that the rollers will turn or rotate very freely. The said rollers are provided with circumferential grooves in their peripheries, and in these grooves is fitted the inner edge of the rotary ring or disk, so that the same is supported very securely in place, and is yet permitted to turn or rotate very freely in order to simultaneously adjust the sections or shutters. The inner side of the ring or disk has a series of gear-teeth, with which mesh a pinion, $i$, that is carried by the upper end of an operating-shaft, I, which is journaled at its upper end in a hanger, $i'$, that is affixed to and depends from the horizontal platform, and the lower end of this operating-shaft is journaled in a bearing, $i^2$, secured at any suitable point near the ground. The operating-shaft I has a hand wheel or lever, J, suitably connected thereto, so that it can be turned or rotated by the hand of the attendant; and said shaft is further provided with a ratchet-wheel, $j$, with which engages one end of a pivoted pawl, $j'$, that is normally pressed in engagement with the ratchet by a spring, $j^2$, which bears against the opposite end of the pawl.

This being the construction of my improved windmill, the operation thereof is as follows: When the sections or shutters of the housing are opened, they lie out of line with and at an angle to each other, and the wind passes very freely through the sections to operate the wind-wheel and thus rotate the vertical shaft and the machinery connected therewith by the counter-shaft. The shutters or sections are prevented from being closed by the action of the wind thereon by reason of the operating-shaft I being held against rotation by the pawl-and-rachet mechanism, and the sections can be opened or closed to any desired extent by turning the said operating-shaft the required distance and then throwing the pawl into engagement with the ratchet to prevent retrograde movement of the shaft. When the shaft is turned or rotated by hand, the pinion on the upper end thereof, meshing with the gear-teeth of the rotary ring or disk, turns the latter, which actuates the arms through the intermediate links and thus adjusts the shutters or sections to any desired extent.

It will thus be seen that the wind-wheel can be protected from high winds and the weather by merely adjusting the operating-shaft to close the sections or shutters of the housing together, and the sections can be easily and rapidly opened by a person standing on the ground.

Various changes in the form and proportion of parts and details of construction can be made without departing from the spirit of my invention.

Having thus fully described my invention, what I claim as new, and desire to secure by Letters Patent, is—

1. In a windmill, the combination, with a shaft and a wheel carried thereby, of a housing inclosing the wheel and comprising a series of sections which are independently pivoted and arranged out of contact with each other when opened to leave intermediate spaces, a rotary ring or disk arranged out of the path of the sections of the housing, connections intermediate of the ring and the housing-sections for simultaneously opening or closing the latter when the ring is moved, the friction-rollers on which the rotary ring is supported, and means connected with the ring for operating the same, substantially as described, for the purpose set forth.

2. In a windmill, the combination of a vertical shaft carrying a wheel, a housing inclosing the wheel and comprising a series of centrally-pivoted sections or shutters, each carrying an arm, a rotary disk or ring having the gear-teeth, the friction-rollers for supporting the disk or ring, the links intermediate the ring and the arms of the sections, a vertical operating-shaft carrying a pinion geared to the ring, and pawl-and-ratchet mechanism connected with the shaft, substantially as described, for the purpose set forth.

In testimony that I claim the foregoing as my own I have hereto affixed my signature in presence of two witnesses.

JOHN BERNARD SOHN.

Witnesses:
F. M. FEATHERSTON,
ALSALIO HERRERA.